UNITED STATES PATENT OFFICE.

LÈON FIVÈ, OF PARIS, FRANCE, ASSIGNOR TO LA SOCIÉTÉ DES PLAQUES LITHOGRAPHIQUES, OF SAME PLACE.

PRODUCTION OF LITHOGRAPHIC PLATES.

SPECIFICATION forming part of Letters Patent No. 606,709, dated July 5, 1898.

Application filed April 19, 1897. Serial No. 632,855. (No specimens.)

*To all whom it may concern:*

Be it known that I, LÈON FIVÈ, a citizen of Belgium, residing at Paris, France, have invented certain new and useful Improvements in the Production of Lithographic Plates; and I do hereby declare the following to be a full, clear, and exact description of the invention, such as will enable others skilled in the art to which it appertains to make and use the same.

My invention has relation to the production of a factitious lithographic plate, and in such connection it relates particularly to a metallic plate having one surface coated or covered with a composition which is an excellent substitute for the ordinary lithographic stone.

My invention consists, first, in the process of preparing the lithographic plate; second, in the process of preparing the composition applied to the face of the plate; third, in the composition the ingredients of which will be hereinafter described and claimed, and, fourth, in the method of securing the composition to the metal backing of the plate.

Lithographic plates prepared according to this invention have the advantage of costing less than the lithographic stones in ordinary use. They are more easily handled and yield excellent impressions.

In order to prepare the paste, crushed lithographic stone of Munich or of other well-known composition is treated with boiling sulfuric acid in a stoneware pan upon a sand bath over a quick fire until it is completely disorganized and has lost most of its carbonic acid. Suitable proportions are two liters of sulfuric acid at 66° to ten kilograms of crushed lithographic stone, of Munich, or of similar well-known composition of stone. When the lithographic stone has lost a major portion of its carbonic acid, consequent upon its treatment with the sulfuric acid, there is added to the mixture the following composition, also in a boiling state: hydrochloric acid at 22°, two liters; solid perchlorid of iron, fifty grams; manganese chlorid, fifty grams. Care must be taken to dissolve these salts in the hydrochloric acid. A lively effervescence is produced by the escaping carbonic-acid gas, and a yellow-greenish-colored mass is formed, which after further treatment is to form the printing-surface of the plate in substitution for the ordinary lithographic stone. It should be continually stirred. When the effervescence is almost terminated and the mass, except certain portions of unattacked stone, is reduced to a perfectly homogeneous paste, water is added in small quantities in such a manner as not to drown the paste. It is allowed to boil for an hour in order that the reaction may be completely terminated and the transformation complete. This semiliquid paste is then thrown into an earthenware vessel full of water. After several hours this paste will be found deposited at the bottom of the vessel. It is decanted and again washed with water. The washing is continued until the wash-water is completely neutral—that is to say, until the supernatent wash-water no longer reddens blue litmus-paper. The paste is then drained and pressed and is now ready to be employed as the printing-surface of the factitious lithographic plates, as will be hereinafter explained The reactions during the treatment of the crushed stone have not been accurately or particularly observed; but it may be stated that there is formed a paste of which chlorid of calcium is the main constituent.

There is placed in an enameled sheet-iron vessel having a capacity of about two hundred liters three kilograms four hundred grams of paste, prepared as above, which has been diffused in ten liters of water. There is then added, while stirring, five to six liters of water in which has been dissolved six hundred and twenty-two grams of bicarbonate of soda. The bicarbonate of soda has for its object to reconstitute a portion of the carbonate of lime destroyed in the preparation of the paste and to eliminate the last traces of acidity. A mixture is then made of albumen, one hundred and thirty grams; glue, (*colle de nerfs*,) seventy grams; potash silicate, five hundred and forty-four grams. The albumen and glue are dissolved in about ten liters of water at 30° centigrade. Potassium silicate is then added, and this mixture is poured, care being taken to continuously stir, upon the bicarbonated paste in the vessel of two hundred liters' capacity. The albumen, glue, and potassium silicate have the effect of giving adhesive power to the composition. The vessel is then filled with water to which has been added two hundred and seventy-five grams of liquid perchlorid of iron, giving color to the mixture. The composition is now ready to be applied to the plates.

Before applying the composition upon the plates it is necessary to submit them to a special preparation, such as washing and then graining. The sheets or plates of zinc or other metal of suitable dimensions are first washed with a solution of hydrochloric acid at two per cent. They are vigorously brushed in order to well scour them, then washed with much water, sponged, and steam-dried.

It is necessary to well dry the plates, because water remaining oxidizes them and forms spots which it is almost impossible to remove without attacking the metal.

Graining of the plates is preferably effected by means of a sand-blast or other suitable mechanism or apparatus. The plates thus grained are again washed with water, scoured with a solution of hydrochloric acid at two per cent., brushed to remove dust and any grains of sand which may adhere there, deacidified with a solution of bicarbonate of soda at two and one-half per cent., brushed, washed with water, sponged, and then immediately steam-dried. In this state they are ready to receive a layer of paste. For this purpose they are placed in vessels open at the top to receive the plates and interiorly heated to about 160° centigrade by means of steam introduced through perforated tubes. The liquid mass above described, carefully kept in continual agitation, is projected upon these plates heated to the temperature indicated. Pulverizers or other analogous apparatus are employed for this purpose. Consequent upon the high temperature of the plates at the moment at which the liquid mass is projected upon them water is rapidly evaporated and the solid part of the paste is deposited upon the plates. When a tenth of the liquid has thus been projected, the plate is drawn out of the vessel, washed with much water, brushed, again washed, and carefully sponged. This operation has for its object the removal of the solid particles only imperfectly adhering and which would prevent the successive layers from forming a homogeneous whole. The plate is then replaced in the vessel and the operation repeated, and so on until all the liquid mass has been used. Ten successive operations are generally needed. A layer of about one-half millimeter thick is obtained. The plates are then steam-dried, carefully wiped, and stored in a dry place.

In certain cases plates having a gray tint cannot be employed, and hence plates having a different coating may be manufactured by proceeding as follows: Before projecting the successive layers of liquid matter upon the plates the sheets serving as backing are colored by applying to them three coatings of a composition or paste consisting of oxid of zinc eighty-six grams; potassium silicate, eleven hundred grams; albumen, sixty-five grams; water, thirty liters. The liquid mass is then applied, as above described. The color of the plates may be modified as desired by using metallic salts of suitable colors instead of oxid of zinc.

I do not limit myself to the various details of the processes hereinabove described nor to the exact proportions indicated, as the same may be varied without departing from the spirit of my invention.

Having thus described the nature and objects of my invention, what I claim as new, and desire to secure by Letters Patent, is—

1. A composition of matter for factitious lithographic plates, consisting of a paste formed from crushed lithographic stone treated with sulfuric acid to which is added a mixture of hydrochloric acid, solid perchlorid of iron, chlorid of manganese, and bicarbonate of soda and an adhesive mixture consisting of albumen, glue and potassium silicate in suitable proportions, substantially as and for the purposes described.

2. A composition of matter for factitious lithographic plates, consisting of a paste formed from crushed lithographic stone treated with sulfuric acid to which is added a mixture, consisting of hydrochloric acid, solid perchlorid of iron, chlorid of manganese and bicarbonate of soda, then adding an adhesive mixture, consisting of albumen, glue and potassium silicate and finally adding a coloring mixture consisting of perchlorid of iron, substantially as and for the purposes described.

In testimony whereof I affix my signature in presence of two witnesses.

LÉON FIVÈ.

Witnesses:
EDWARD P. MACLEAN,
PAUL DE MESTRAL.